(12) United States Patent
Guo et al.

(10) Patent No.: US 8,452,905 B2
(45) Date of Patent: May 28, 2013

(54) SERIAL PORT REMOTE CONTROL CIRCUIT

(75) Inventors: Qiang Guo, Shenzhen (CN); Min Tan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/081,522

(22) Filed: Apr. 7, 2011

(65) Prior Publication Data
US 2012/0246366 A1    Sep. 27, 2012

(30) Foreign Application Priority Data
Mar. 21, 2011    (CN) .......................... 2011 1 0067665

(51) Int. Cl.
*G06F 13/12*    (2006.01)
*G06F 13/38*    (2006.01)

(52) U.S. Cl.
CPC .................................... *G06F 13/385* (2013.01)
USPC .......................................... 710/70; 710/105

(58) Field of Classification Search
USPC ........................................................ 710/306
See application file for complete search history.

(56) References Cited

U.S. PATENT DOCUMENTS

| | | | |
|---|---|---|---|
| 6,978,319 B1 * | 12/2005 | Rostoker et al. | 709/250 |
| 7,091,747 B2 * | 8/2006 | Hsieh | 326/68 |
| 2006/0006907 A1 * | 1/2006 | Hsieh | 326/70 |
| 2006/0033548 A1 * | 2/2006 | Hsieh | 327/333 |

OTHER PUBLICATIONS

Wang et al.; "The Design of RS232 and CAN Protocol Converter Based on PIC MCU"; CCSE; vol. 2, No. 3; Aug. 2009; pp. 176-181.*
"PIC18F2480/2580/4480/4580 Data Sheet"; Microchip Technology Inc.; DS39637D; Mar. 26, 2009; all pages.*

* cited by examiner

*Primary Examiner* — Ryan Stiglic
(74) *Attorney, Agent, or Firm* — Altis Law Group, Inc.

(57) ABSTRACT

A serial port remote control circuit includes a first interface circuit, a control circuit, an output circuit, and a power circuit. The first interface circuit converts recommended standard 232 (RS232) level signals to transistor-transistor logic (TTL) level signals or vice versa. The control circuit is connected to the first interface circuit, to convert the TTL level signals to physical bus signal or vice versa. The output circuit is connected to the control circuit, to convert the received physical bus signals from the control circuit to network bus signals or vice versa. The power circuit outputs a first voltage and a second voltage converted from the first voltage to the control circuit, the first interface circuit, and the output circuit.

7 Claims, 4 Drawing Sheets

SERIAL PORT REMOTE CONTROL CIRCUIT

BACKGROUND

1. Technical Field

The present disclosure relates to control circuits, and particularly relates to a control circuit controlled through a serial port.

2. Description of Related Art

For management and control of electronic devices/appliances, serial ports, such as recommended standard 232 (RS232) are widely used. A maximum data transfer rate of the RS232 is 20 kilobits per second (Kbps), and a maximum transmission distance of the RS232 is 15 meters. However, in large-scale industrial machinery, using serial ports for control may not be feasible due to the distance between the controller and the serial port. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
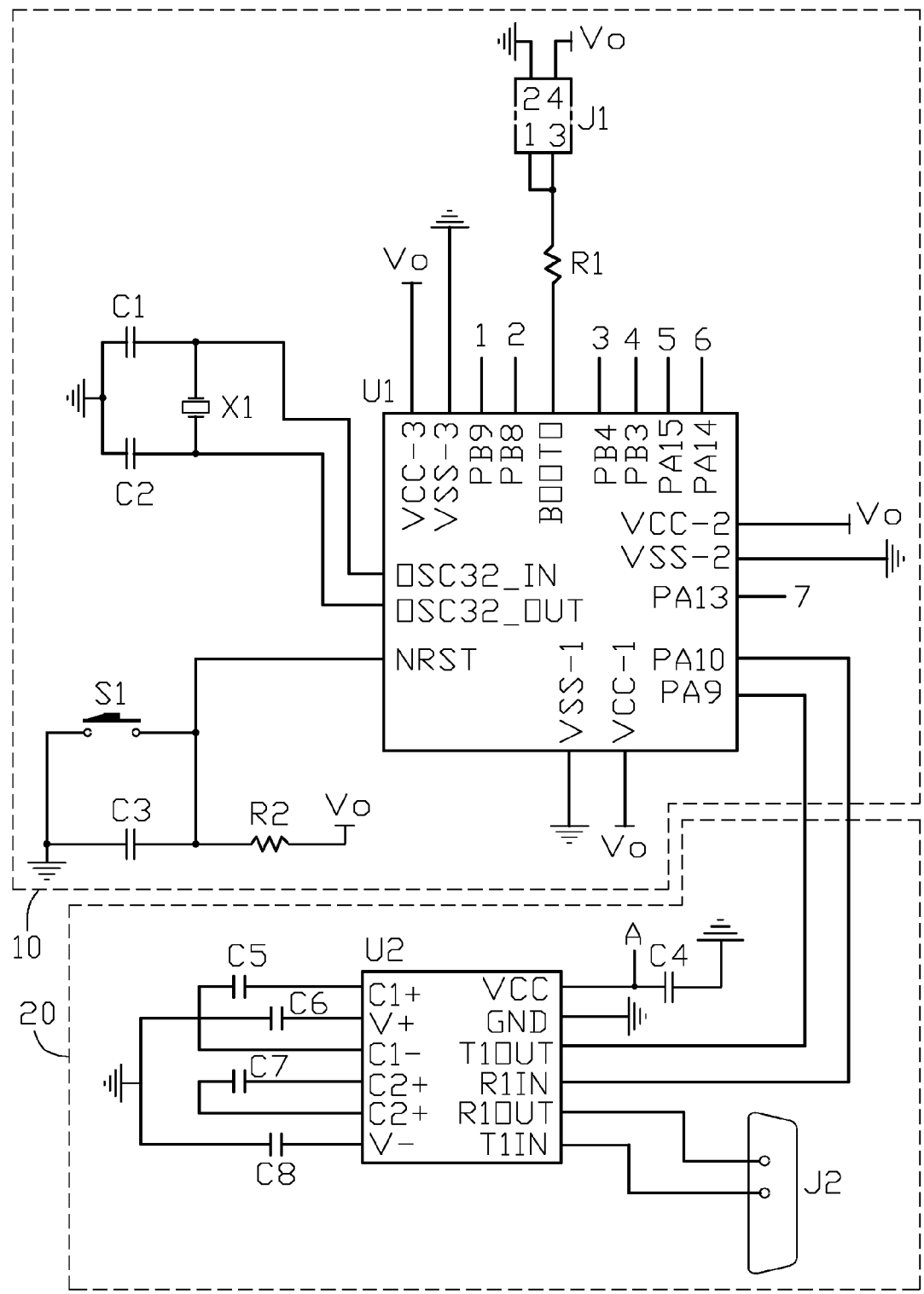
FIG. 1 to FIG. 4 are circuit diagrams of an exemplary embodiment of a serial port remote control circuit.
Figure 2:
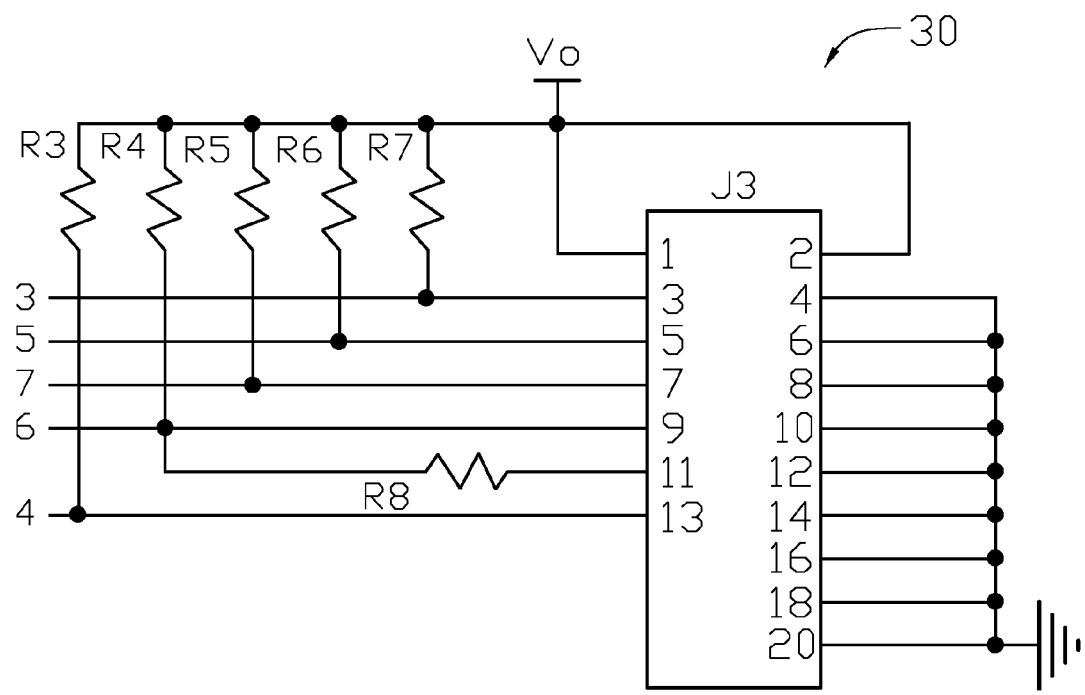
Figure 3:
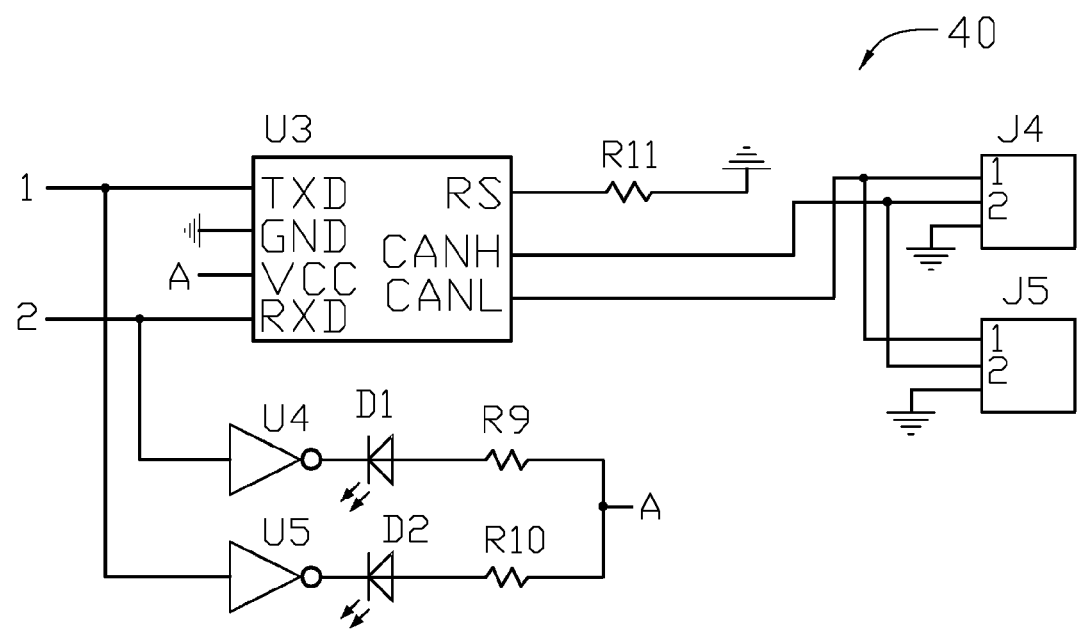
Figure 4:
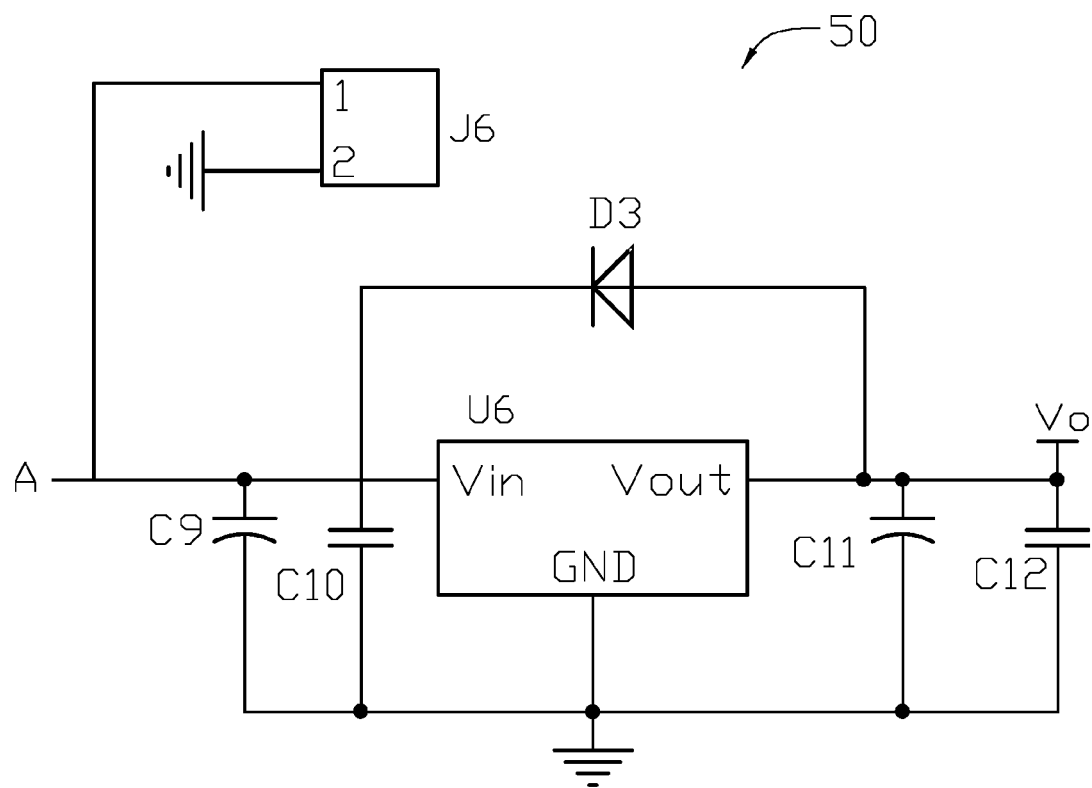

Referring to FIG. 1 to FIG. 4, an exemplary embodiment of a serial port remote control circuit includes a control circuit 10, a first interface circuit 20, a second interface circuit 30, an output circuit 40, and a power circuit 50.

The first interface circuit 20 is connected to a motherboard (not shown) of a computer and also to the control circuit 10. The first interface circuit 20 converts recommended standard 232 (RS232) level signals from the motherboard to transistor-transistor logic (TTL) level signals and output the TTL level signals to the control circuit 10. The control circuit 10 converts the received TTL level signals to physical bus signals and outputs the physical bus signals to the output circuit 40. The output circuit 40 converts the received physical bus signals to network bus signals and outputs the network bus signals to remote devices (not shown), to control the remote devices. At the same time, the remote devices output operation state information in the form of network bus signals to the output circuit 40. The output circuit 40 converts the received network bus signals to physical bus signals and outputs the physical bus signals to the control circuit 10. The control circuit 10 converts the physical bus signals to TTL level signals and outputs the TTL level signal to the first interface circuit 20. The first interface circuit 20 converts the received TTL level signals to RS232 level signals and outputs the RS232 level signals to the motherboard. The second interface circuit 30 is connected to the control circuit 10 and the motherboard, to download control programs from the motherboard to the control circuit 10. The power circuit 50 is connected to the control circuit 10, the first interface circuit 20, the second interface circuit 30, and the output circuit 40, to provide 5 volts (V) and 3.3V to the control circuit 10, the first interface circuit 20, the second interface circuit 30, and the output circuit 40.

The control circuit 10 includes a microcontroller U1, a crystal oscillator X1, a switch S1, a connector J1, resistors R1 and R2, and capacitors C1-C3. Voltage pins VCC_1-VCC_3 of the microcontroller U1 are connected to the power circuit 50. Ground pins VSS_1-VSS_3 of the microcontroller U1 are grounded. A clock pin OSC32_IN of the microcontroller U1 is connected to one terminal of the capacitor C1, and the other terminal of the capacitor C1 is grounded. A clock pin OSC32_OUT of the microcontroller U1 is connected to one terminal of the capacitor C2, and the other terminal of the capacitor C2 is grounded. The crystal oscillator X1 is connected between the clock pins OSC32_IN and OSC32_OUT of the microcontroller U1. A reset pin NRST of the microcontroller U1 is grounded through the switch S1, connected to the power circuit 50 through the resistor R2, and is grounded through the capacitor C3. Input/output (I/O) pins PB8 and PB9 of the microcontroller U1 are connected to the output circuit 40. A setting pin BOOT0 of the microcontroller U1 is connected to pins 1 and 3 of the connector J1 through the resistor R1. A pin 2 of the connector J1 is grounded. A pin 4 of the connector J1 is connected to the power circuit 50. I/O pins PB4, PB3, PA15, PA14, and PA13 of the microcontroller U1 are connected to the second interface circuit 30. I/O pins PA9 and PA10 of the microcontroller U1 are connected to the first interface circuit 20. In one embodiment, the microcontroller U1 is a STM32 type microcontroller, and the connector J1 is a 2×2H type connector.

The first interface circuit 20 includes a level converting chip U2, a connector J2, and capacitors C4-C8. I/O pins T1OUT and R1IN of the level converting chip U2 are respectively connected to the I/O pins PA9 and PA10 of the microcontroller U1 of the control circuit 10. I/O pins R1OUT and T1IN of the level converting chip U2 are connected to the connector J2. A voltage pin VCC of the level converting chip U2 is connected to the power circuit 50 and also connected to one terminal of the capacitor C4, and the other terminal of the capacitor C4 is grounded. The capacitor C5 is connected between I/O pins C1+ and C1− of the level converting chip U2. The capacitor C6 is connected between an I/O pin V+ of the level converting chip U2 and ground. The capacitor C7 is connected between I/O pins C2+ and C2− of the level converting chip U2. The capacitor C8 is connected between an I/O pin V− of the level converting chip U2 and ground. In one embodiment, the level converting chip U2 is a MAX232 type converting chip.

The second interface circuit 30 includes a connector J3 and resistors R3-R8. Pins 1 and 2 of the connector J3 are connected to the power circuit 50. Pins 13, 9, 7, 5, and 3 of the connector J3 are respectively connected to I/O pins PB3, PA14, PA13, PA15, and PB4 of the microcontroller U1, and also connected to the pins 1 and 2 of the connector J3 through the resistors R3-R7, respectively. The resistor R8 is connected between pins 11 and 9 of the connector J3. In one embodiment, the connector J3 is a 10×2 type connector. The connector J2 is a RS232 connector.

The output circuit 40 includes a bus converting chip U3, network connectors J4 and J5, inverters U4 and U5, light emitting diodes (LEDs) D1 and D2, and resistors R9-R11. A sending pin TXD of the bus converting chip U3 is connected to the I/O pin PB9 of the microcontroller U1 and also connected to an input terminal of the inverter U5. An output terminal of the inverter U5 is connected to a cathode of the LED D2. An anode of the LED D2 is connected to the power circuit 50 through the resistor R10. A receiving pin RXD of the bus converting chip U3 is connected to the I/O pin PB8 of the microcontroller U1 and also connected to an input terminal of the inverter U4. An output terminal of the inverter U5 is connected to a cathode of the LED D1. An anode of the LED D1 is connected to the power circuit 50 through the resistor R9. A voltage pin VCC of the bus converting chip U3 is connected to the power circuit 50. An I/O pin RS of the bus converting chip U3 is grounded through the resistor R11. An I/O pin CANH of the bus converting chip U3 is connected to pins 2 of the network connectors J4 and J5. An I/O pin CANL of the bus converting chip U3 is connected to pins 1 of the network connectors J4 and J5. In one embodiment, a type of the bus converting chip U3 is A82C250. The LEDs D1 and D2 are lit when the microcontroller U1 communicates with the bus converting chip U3 normally, otherwise, the LEDs D1 and D2 do not light. In other embodiments, the LEDs D1 and D2 are not included to save cost.

The power circuit 50 includes a voltage converting chip U6, a diode D3, a power connector J6, a voltage output terminal Vo, and capacitors C9-C12. An input pin Vin of the voltage converting chip U6 is grounded through the capacitor C9 and also connected to a pin 1 of the power connector J6 for receiving 5V through the power connector J6. An output pin Vout of the voltage converting chip U6 is connected to an anode of the diode D3 and also connected to the voltage output terminal Vo. A cathode of the diode D3 is grounded through the capacitor C10. The capacitors C11 and C12 are connected in parallel between the voltage output terminal Vo and ground. The pin 1 of the power connector J6 is also connected to the voltage pin VCC of the level converting chip U2 of the first interface circuit 20, the voltage pin VCC of the bus converting chip U3 of the output circuit 40, and first ends of the resistors R9 and R10 of the output circuit 40. The voltage output terminal Vo is also connected to the pin 4 of the connector J1 of the control circuit 10, the voltage pins VCC_1-VCC_3 of the microcontroller U1, and a first end of the resistor R2 of the control circuit 10. The voltage output terminal Vo is also connected to the pins 1 and 2 of the connector J3 of the second interface circuit 30.

In use, the connector J2 is connected to a serial port of the motherboard, the connector J3 is connected to a connector, which is set on the motherboard and connected to a memory of the motherboard, to transmit control programs stored in the memory to the microcontroller U1, the power connector J6 is connected to a power supply of the computer for receiving a 5V, and the connector J1 is electrically connected to a connector of a start device, for starting the microcontroller U1 by an external device when the microcontroller U1 can not be started from an inside memory of the microcontroller U1. The computer is powered on, the power circuit 50 provides the received 5V from the power connector J6 and the 3.3V converted from the 5V to the control circuit 10, the first interface circuit 20, the second interface circuit 30, and the output circuit 40. The microcontroller U1 receives control programs through the connector J3. The motherboard sends control instructions in the form of RS232 level signals to the level converting chip U2 through the connector J2. The level converting chip U2 converts the received RS232 level signals to TTL level signals and outputs the TTL level signals to the microcontroller U1. The microcontroller U1 converts the received TTL level signals to the physical bus signals and outputs the physical bus signals to the bus converting chip U3. The bus converting chip U3 converts the received physical bus signals to network bus signals and outputs the network bus signals to the remote devices through the network connectors J4 and J5, to control the remote devices to operate.

The remote devices output operation states information in the form of network bus signals through the network connectors J4 and J5 to the bus converting chip U3. The bus converting chip U3 converts the received network bus signals to physical bus signals and outputs the physical bus signals to the microcontroller U1. The microcontroller U1 converts the physical bus signals to TTL level signals and outputs the TTL level signals to the level converting chip U2. The level converting chip U2 converts the TTL level signals to RS232 level signals and outputs the RS232 level signals to the motherboard through the connector J2, to monitor operation state of the remote devices by the computer. The LEDs D1 and D2 are lit when the computer communicates with the remote devices normally, otherwise, the LEDs D1 and D2 do not light. The microcontroller U1 can be reset by pressing the switch S1.

The control circuit 10 receives TTL level signals through the first interface circuit 20 and converts the TTL level signals to physical bus signals, and outputs the physical bus signals to the remote devices through the output circuit 40 for controlling the remote devices to operate. At the same time, the computer monitors the operation state of the remote devices according to the output operation state information from the remote devices. Therefore, the serial port remote control circuit can control and monitor the remote devices through serial ports.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A serial port remote control circuit, comprising:
 a first interface circuit to receive recommended standard 232 (RS232) level signals and convert the RS232 level signals to transistor-transistor logic (TTL) level signals, or receive TTL level signals and convert the TTL level signals to RS232 level signals;
 a control circuit connected to the first interface circuit, to convert the TTL level signals to physical bus signals, or convert physical bus signals to TTL level signals;
 an output circuit connected to the control circuit, to convert the physical bus signals from the control circuit to network bus signals, or convert network bus signals to physical bus signals and output the physical bus signals to the control circuit;
 a power circuit connected to the first interface circuit, the control circuit, and the output circuit, to provide a first voltage and a second voltage to the control circuit, the first interface circuit, and the output circuit; and
 a second interface circuit connected to the control circuit and the power circuit, to download control programs to the control circuit;
 wherein the control circuit comprises a microcontroller, a crystal oscillator, a switch, a first connector, first and second resistors, and first to third capacitors, wherein first to third voltage pins of the microcontroller are connected to the power circuit, a first clock pin of the microcontroller is connected to one terminal of the first capacitor, and the other terminal of the first capacitor is grounded, a second clock pin of the microcontroller is connected to one terminal of the second capacitor, and the other terminal of the second capacitor is grounded, the crystal oscillator is connected between the first and the second clock pins of the microcontroller, a reset pin of the microcontroller is grounded through the switch, connected to the power circuit through the second resistor, and also grounded through the third capacitor, first and second input/output (I/O) pins of the microcontroller are connected to the output circuit, a setting pin of the microcontroller is connected to first and third pins of the first connector through the first resistor, a fourth pin of the first connector is connected to the power circuit, third to seventh I/O pins of the microcontroller are connected to the second interface circuit, eighth and ninth I/O pins of the microcontroller are connected to the first interface circuit.

2. The serial port remote control circuit as claimed in claim 1, wherein the first interface circuit comprises a level converting chip, a second connector, and fourth to eighth capacitors, wherein first and second I/O pins of the level converting chip are respectively connected to the eighth and the ninth I/O pins of the microcontroller, third and fourth I/O pins of the level converting chip are connected to the second connector, a voltage pin of the level converting chip is connected to the power circuit and also connected to an end of the fourth capacitor, another end of the fourth capacitor is grounded, a fifth capacitor is connected between a fifth I/O pin and a sixth I/O pin of the level converting chip, the sixth capacitor is connected between a seventh I/O pin of the level converting chip and ground, the seventh capacitor is connected between an eighth I/O pin and a ninth I/O pin of the level converting chip, the eighth capacitor is connected between a tenth I/O pin of the level converting chip and ground.

3. The serial port remote control circuit as claimed in claim 2, wherein the second interface circuit comprises a third connector, and third to eighth resistors, wherein first and second pins of the third connector are connected to the power circuit, third to seventh pins of the third connector are respectively connected to the third to the seventh I/O pins of the microcontroller, and also connected to the first and the second pins of the third connector through the third to the seventh resistors, respectively.

4. The serial port remote control circuit as claimed in claim 3, wherein the output circuit comprises a bus converting chip, first and second network connectors, and a ninth resistor, wherein a sending pin of the bus converting chip is connected to the first I/O pin of the microcontroller, a receiving pin of the bus converting chip is connected to the second I/O pin of the microcontroller, a voltage pin of the bus converting chip is connected to the power circuit, a first I/O pin of the bus converting chip is grounded through the ninth resistor, a second I/O pin of the bus converting chip is connected to second pins of the first and the second network connectors, a third I/O pin of the bus converting chip is connected to first pins of the first and the second network connectors.

5. The serial port remote control circuit as claimed in claim 4, wherein the output circuit further comprises first and second inverters, first and second light emitting diodes (LEDs), and tenth and eleventh resistors, wherein an input terminal of the first inverter is connected to the sending pin of the bus converting chip, an output terminal of the first inverter is connected to a cathode of the first LED, an anode of the first LED is connected to the power circuit through the tenth resistor, an input terminal of the second inverter is connected to the receiving pin of the bus converting chip, an output terminal of the second inverter is connected to a cathode of the second LED, an anode of the second LED is connected to the power circuit through the eleventh resistor.

6. The serial port remote control circuit as claimed in claim 5, wherein the power circuit comprises a voltage converting chip, a diode, a power connector, a voltage output terminal, and ninth to twelfth capacitors, wherein an input pin of the voltage converting chip is grounded through the ninth capacitor and also connected to a first pin of the power connector, to receive the first voltage through the power connector, an output pin of the voltage converting chip is connected to an anode of the diode and also connected to the voltage output terminal, a cathode of the diode is grounded through the tenth capacitor, the eleventh and the twelfth capacitors are connected in parallel between the voltage output terminal and ground, the first pin of the power connector is also connected to the voltage pin of the level converting chip of the first interface circuit, the voltage pin of the bus converting chip of the output circuit, and also connected to first ends of the tenth and the eleventh resistors of the output circuit, the voltage output terminal is also connected to the fourth pin of the first connector of the control circuit, the first to third voltage pins of the microcontroller, and a first end of the second resistor of the control circuit, the voltage output terminal is also connected to the first and the second pins of the third connector of the second interface circuit.

7. The serial port remote control circuit as claimed in claim 1, wherein the first voltage is 5 volts (V), and the second voltage is 3.3V.

* * * * *